(No Model.) 5 Sheets—Sheet 1.

T. J. LINDSAY.
GEAR CUTTING MACHINE.

No. 572,207. Patented Dec. 1, 1896.

WITNESSES:

INVENTOR
Thomas J. Lindsay,
BY Chester Bradford
ATTORNEY.

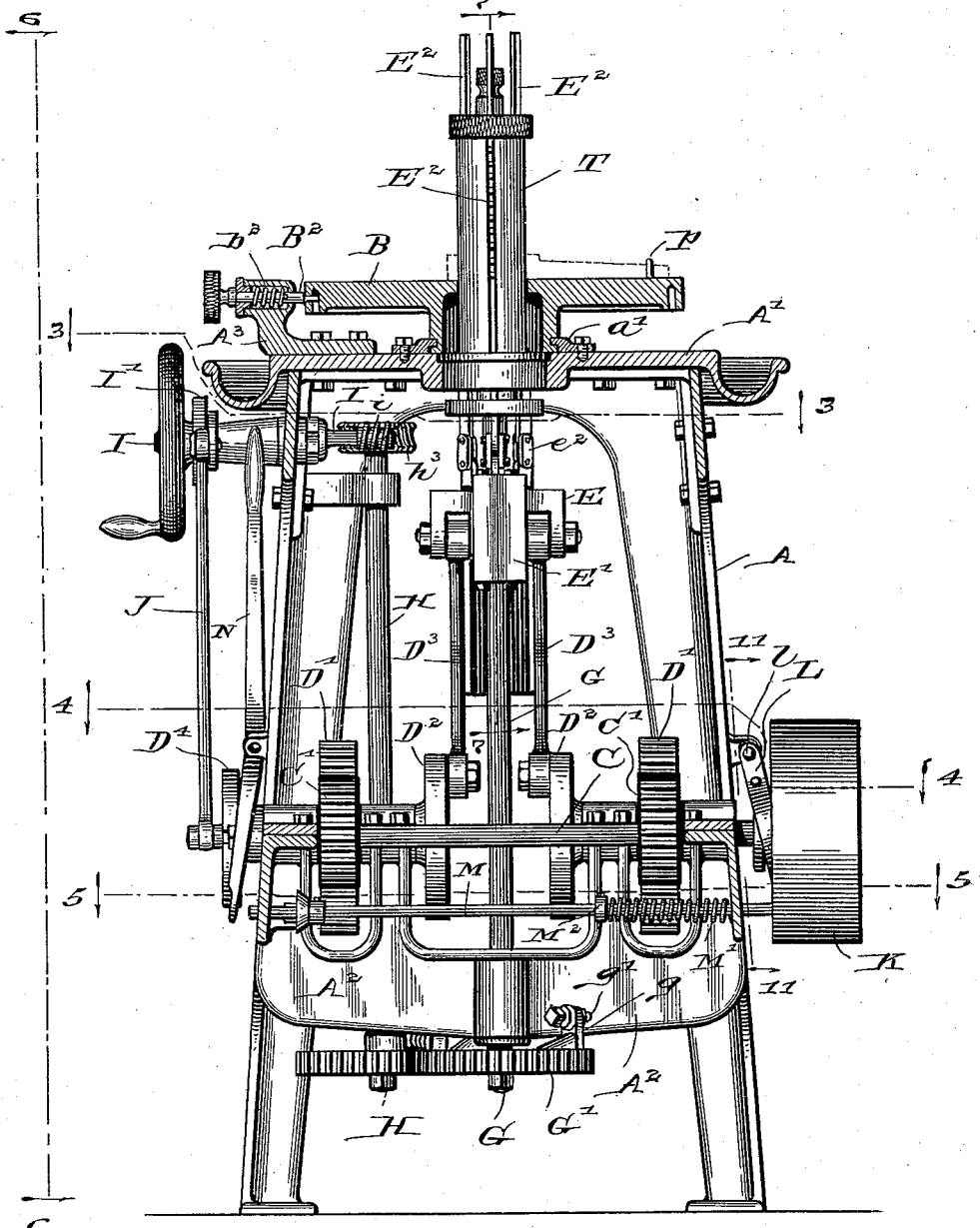

(No Model.) 5 Sheets—Sheet 3.

T. J. LINDSAY.
GEAR CUTTING MACHINE.

No. 572,207. Patented Dec. 1, 1896.

WITNESSES:
H. B. Nealy
J. A. Walsh

INVENTOR
Thomas J. Lindsay,
BY Chester Bradford,
ATTORNEY.

(No Model.)

T. J. LINDSAY.
GEAR CUTTING MACHINE.

No. 572,207. Patented Dec. 1, 1896.

WITNESSES:

INVENTOR
Thomas J. Lindsay,
BY
Lchester J. Bradford.
ATTORNEY:

(No Model.) 5 Sheets—Sheet 5.
T. J. LINDSAY.
GEAR CUTTING MACHINE.
No. 572,207. Patented Dec. 1, 1896.
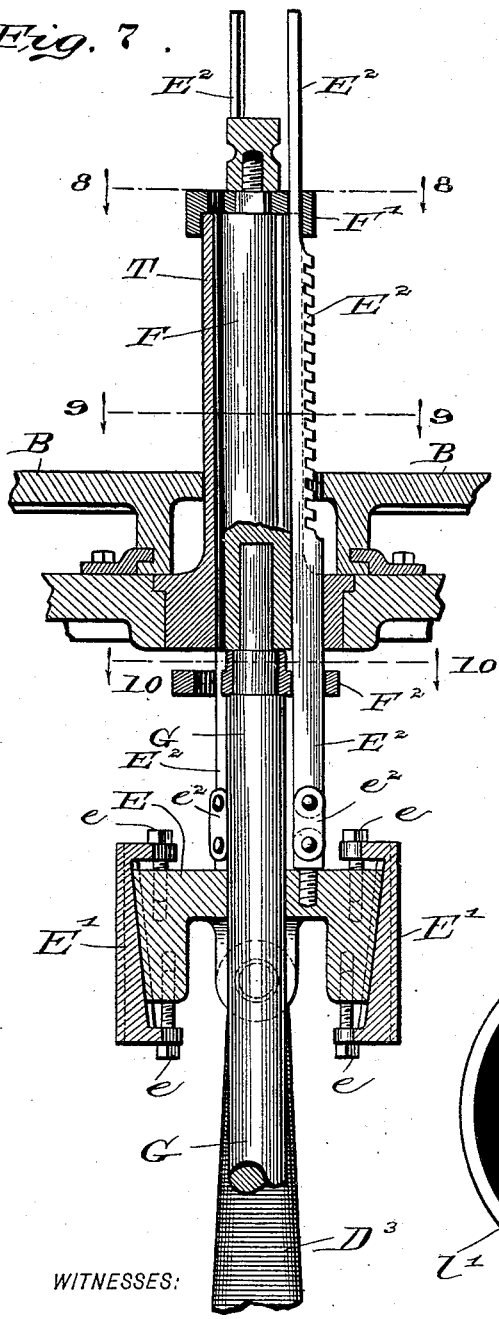
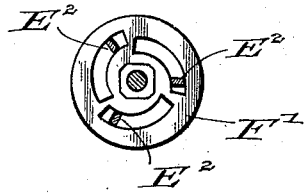
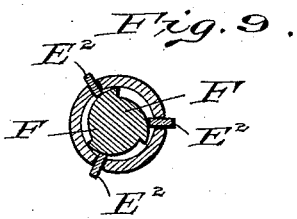
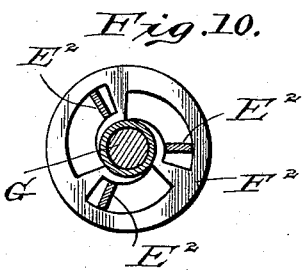
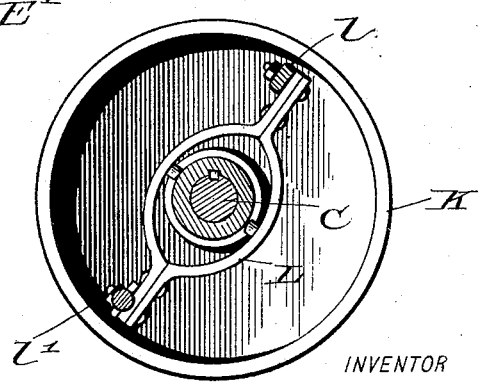
WITNESSES: INVENTOR
Thomas J. Lindsay,
Chester Bradford,
ATTORNEY.

UNITED STATES PATENT OFFICE.

THOMAS J. LINDSAY, OF LAFAYETTE, INDIANA.

GEAR-CUTTING MACHINE.

SPECIFICATION forming part of Letters Patent No. 572,207, dated December 1, 1896.

Application filed December 4, 1895. Serial No. 571,026. (No model.)

*To all whom it may concern:*

Be it known that I, THOMAS J. LINDSAY, a citizen of the United States, residing at Lafayette, in the county of Tippecanoe and State of Indiana, have invented certain new and useful Improvements in Gear-Cutting Machines, of which the following is a specification.

The object of my said invention is to produce a machine for cutting internal gear-teeth by means of which several teeth can be cut at a single operation, whereby rapidity of execution of the work is secured, while at the same time, the stress of the work being equal in all directions outwardly from a common center, uniformity of product is assured and unduly strong and heavy clamping devices dispensed with.

A machine embodying my said invention will be first fully described, and the novel features thereof then pointed out in the claims.

Figure 1:
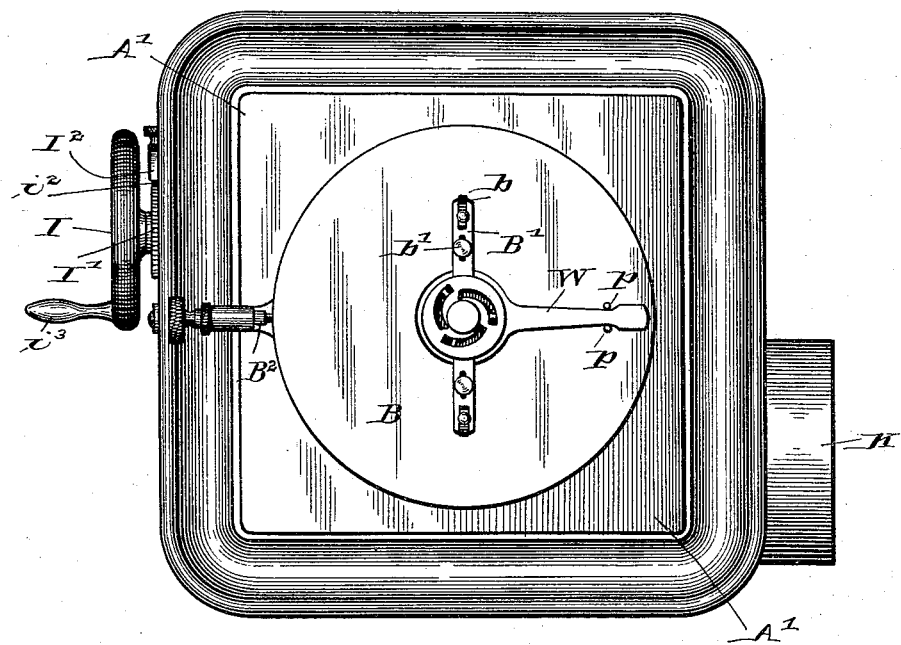
Figure 4:
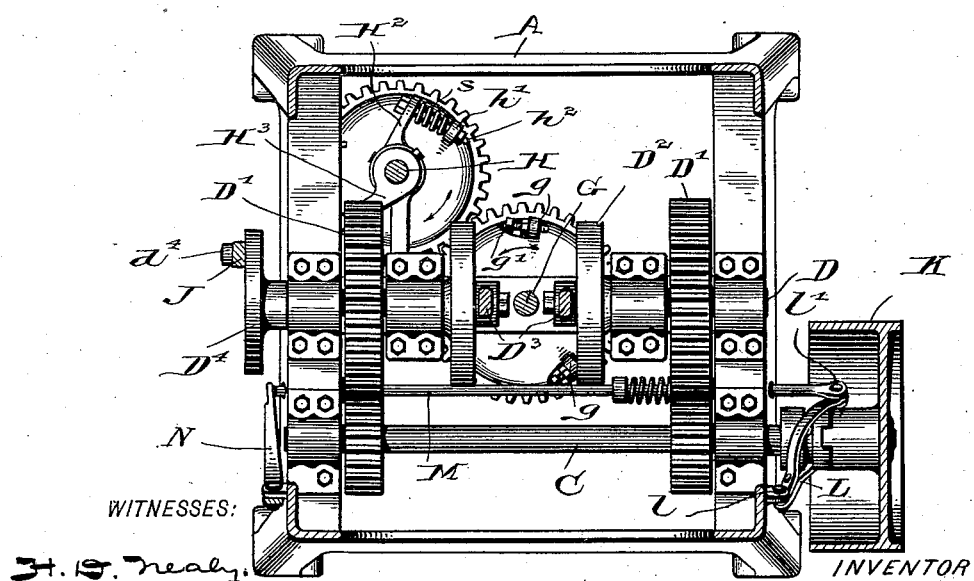
Figure 3:
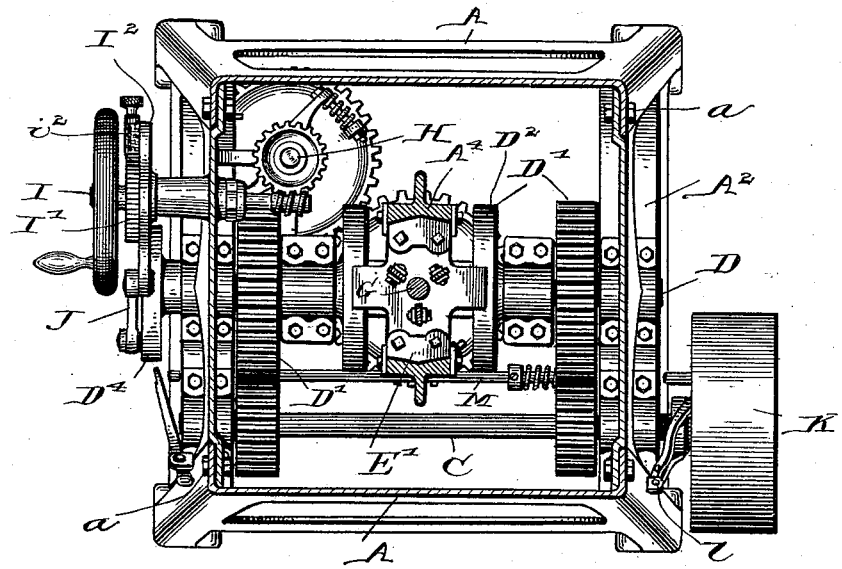
Figure 5:
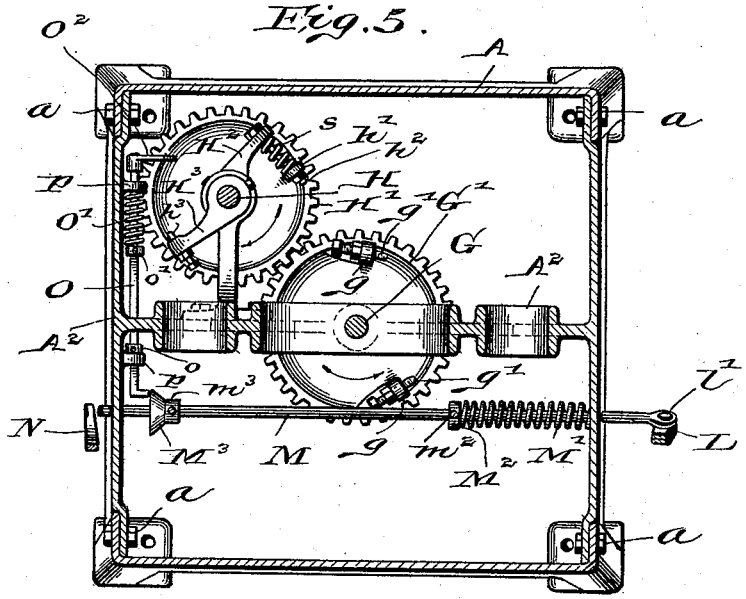
Figure 6:
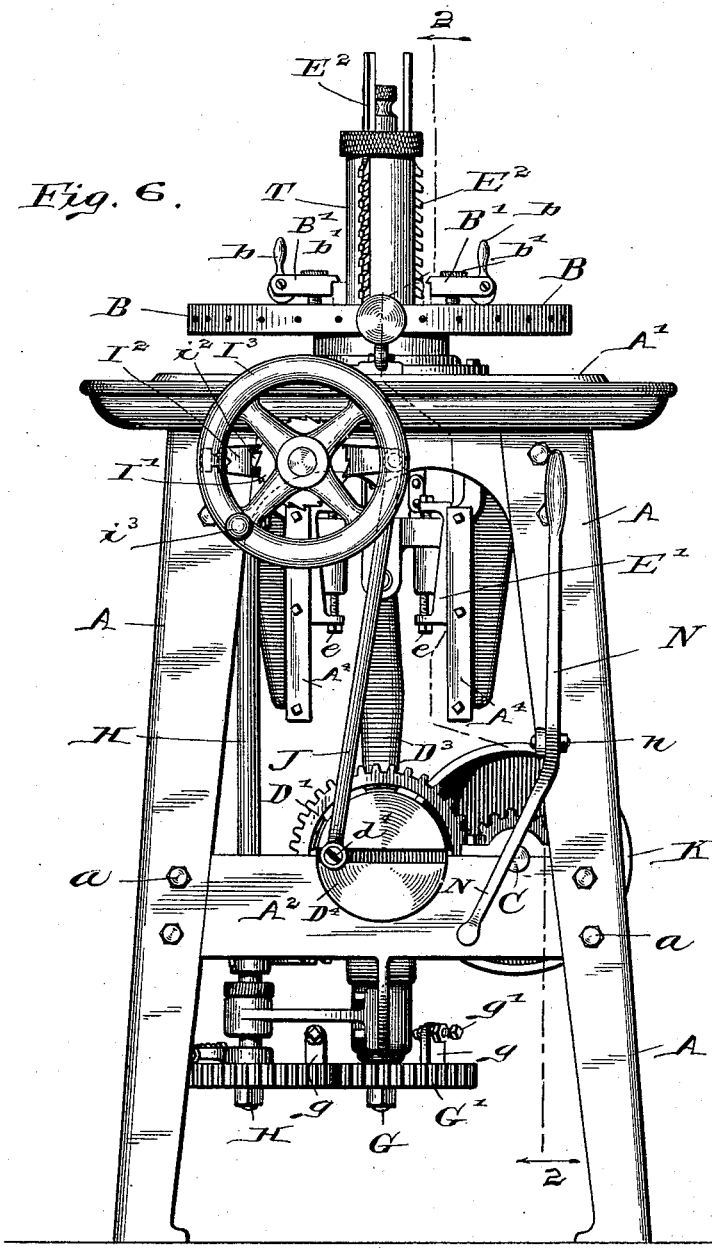

Referring to the accompanying drawings, which are made a part hereof, and on which similar letters of reference indicate similar parts, Figure 1 is a top or plan view of a machine embodying my said invention; Fig. 2, a vertical sectional view thereof as seen when looking in the direction indicated by the arrows from the irregular dotted line 2 2 in Fig. 6; Figs. 3, 4, and 5, horizontal sectional views looking downwardly, respectively, from the dotted lines 3 3, 4 4, and 5 5 in Fig. 2; Fig. 6, a side elevation of said machine as seen from the dotted line 6 6 alongside Fig. 2; Fig. 7, a detail sectional view through the cutter-head and immediately-adjacent parts as seen from the dotted line 7 7 in Fig. 2; Figs. 8, 9, and 10, detail horizontal sectional views as seen when looking outwardly from the dotted lines 8 8, 9 9, and 10 10, respectively, in Fig. 7; and Fig. 11, a detail view of the clutch and driving-pulley as seen when looking toward the right from the dotted line 11 11 in Fig. 2.

In said drawings the portions marked A represent the framework of the machine; B, a rotatable table mounted thereon; C, a driving-shaft; D, crank-shafts; E, a cutter-head; F, a cam-feeder for the cutters; G, a shaft or rod by which the feeder is operated; H, a shaft by means of which said feeder-operating shaft is intermittingly driven; I, a shaft by which, through a worm-gear, said last-named shaft is driven; J, a pitman connected with a crank-shaft and operating the feed-works to the last-named shaft; K, a driving-pulley; L, a clutch-yoke; M, a rod for immediately operating said clutch-yoke; N, a lever for throwing said rod and clutch into operative condition, and O a detent for holding said rod when so operated.

The frame A is of a suitable construction to carry the mechanism of this machine. It has a top A' and a bridge-tree A², upon which the mechanism is mainly mounted. The top is secured upon the tops of the frame legs or sides in an ordinary manner, and centrally thereon is mounted the cutter-inclosing tube T, which is rigidly connected thereto and extends upwardly therefrom through the table B to receive the cutters, as will be hereinafter more fully explained. Said top is shown as provided with a surrounding gutter to receive the oil used in operating the machine, which might otherwise run off and besmear the machinery and workmen. The bridge-tree is of peculiar formation, as shown most plainly in Figs. 2 and 5. In Fig. 2 its general outline is shown and the attachment to the frame A by means of bolts *a* illustrated, while in Fig. 5 the U-shaped formation of its central member is most clearly shown, said formation being for the purpose of receiving the crank-wheels and gear-wheels mounted on the crank-shaft C.

The table B is designed to receive the work, and is secured to the frame-top A', preferably by means of brackets *a'*, which enter an annular groove in an extension of said table projecting from its under side, as shown most plainly in Fig. 2. It is provided with suitable stays and clamps whereby the work may be secured thereon. In Fig. 1 in full lines and in Figs. 2 and 6 in dotted lines such a piece of work W is shown. I have selected for this illustration a bicycle-crank arm of the character illustrated in the Patent No. 545,408, issued to me August 27, 1895, although, of course, the machine is capable of cutting internal gears upon any mechanism possible. The illustrated means for holding the work in position consists in pins *p* and clamp-jaws B', the latter being held to the table by bolts *b'* and operated by cams *b*. This table B, as shown most plainly in Fig.

6, has a row of perforations in its periphery, and said perforations are equal in number to the number of cuts which it may be desired to make with the machine. A bracket $A^3$ on the table-top $A'$ carries a locking-pin $B^2$, which is adapted to engage with either of said perforations. I have shown in Fig. 2 this pin as surrounded by an operating-spring $b^2$, by which it will be normally held into engagement. The operation is, after a series of cuts have been made and it is desired to shift the machine for a fresh series, that this locking-pin is retracted by hand, and thus disengaged from the perforation with which it registers, the table B revolved to the position required for the next series of cuts, and the locking-pin inserted in the perforation with which it newly registers. These perforations being carefully spaced and the locking-pin accurately fitted, a very high degree of accuracy of operation is secured, particularly when it is remembered that the point of engagement of the table with the locking-pin is at a much greater distance from the axis than the cutters, and so the proportion of variation, if any at all exists, is very much reduced at the point of cutting.

The driving-shaft C is an ordinary shaft mounted in bearings in the transverse members of the frame part $A^2$, and has spur-pinions $C'$ mounted thereon, which engage with and drive the spur gear-wheels $D'$ on the crank-shafts D. Said driving-shaft is itself intermittingly driven by means which will presently be described.

The crank-shafts D bear the spur gear-wheels $D'$ and the crank-wheels $D^2$, and are driven, as just stated, from the driving-shaft C. The crank-wheels connect with pitmen $D^3$, which operate the cutter-head E. By having two crank-shafts and two pitmen, one connected to each side of the cutter-head, great strength and steadiness of motion are secured.

The cutter-head E is best illustrated in Figs. 2 and 7, being shown also in plan in Fig. 3, and a partial elevation thereof being shown in Fig. 6, where its engagement with its guides is best seen. Said cutter-head reciprocates vertically, being driven by the pitmen $D^3$, and rests in bearings in the guides $A^4$, which, as already stated, are best shown in Fig. 6 and in horizontal section in Fig. 3, said guides being firmly connected to the under side of the frame-top $A'$.

The bearing-plates $E'$ of the cross-head E are made adjustable, as shown in Fig. 7, said bearing-plates having tapered surfaces, which engage with corresponding tapered surfaces on the cross-head proper, and being adjustable vertically thereon by means of joint-bolts $e$. By this means accuracy of fit between the cutter-head and its guides is easily secured. The cutters $E^2$ are secured to the cutter-head E by links $e^2$, it being necessary that the connection should be a yielding one in order to permit the cutters to feed outwardly without straining. Said cutters extend up through the cutter-inclosing tube T on the frame-top A, and the cutting edges thereof extend out through slots in the sides of said cutter-inclosing tube, as shown most plainly in Fig. 9, and are thus adapted to engage with the work and cut the gears as they are fed out through said slots.

The cam-feeder F is mounted within the cutter-inclosing tube T, behind the cutters $E^2$. It is provided with as many cam-faces as there are cutters. Three are shown, although, of course, a different number might be employed. Said cam-feeder is revolved slowly as the cutting proceeds, and thus forces the cutters $E^2$ outwardly into the work, as will be readily understood. Cap-pieces $F'$ and $F^2$ are secured to the two ends of the cam-feeder F and move therewith. As shown in Figs. 8 and 10, these caps have cam-slots corresponding to the cam-faces of the feeder F, by which the upper and lower ends of the cutters are guided.

The rod or shaft G is strongly secured to the cam-feeder F and practically forms a continuation thereof. It extends to the bottom of the machine, where a spur gear-wheel $G'$ is secured thereon, by means of which it is driven. Upon the upper surface of this gear-wheel are two lugs $g$, containing the adjustable stops $g'$ $g'$, which as the shaft G is revolved back and forth successively come in contact with the two sides of the bridge-tree $A^2$, preventing its further movement in the direction in which it is at the time moving, with the result which will be presently explained. As said stops are adjustable, (being preferably screw-pins,) this movement can be accurately determined.

The shaft H is mounted, preferably parallel with the shaft G, in suitable bearings on the framework, and carries at its lower end a spur gear-wheel $H'$, which engages with the gear-wheel $G'$ on said shaft G. The gear-wheel $H'$ is loosely mounted on the shaft H and is driven from an arm $H^2$, which is rigidly mounted on said shaft and which is connected to a lug $h'$ on the wheel $H'$ by a bolt $h^2$, and surrounding said bolt and interposed between said arm and said lug is a coiled spring $s$. This spring is sufficiently strong so that normally the gearing is driven substantially as though the connections were rigid; but when the stop $g'$ comes in contact with the bridge-tree and further rotation of the gear-wheel $G'$ and shaft G is prevented, thus stopping also the rotation of the gear-wheel $H'$, the shaft H is permitted to continue a short distance, compressing the spring $s$, for a purpose which will be presently described.

The shaft I is mounted, preferably horizontally, in a suitable bearing upon the frame A and has upon its inner end a worm $i$, which engages with a worm-wheel $h^3$ on the upper end of the shaft H, and is thus adapted to drive said shaft. At or near the outer end of said shaft is a ratchet-wheel I', rigidly mounted thereon, and alongside said ratchet-wheel is a rocker-arm I², loosely mounted on said shaft and carrying at one end a pawl $i^2$, which engages with the teeth of the ratchet-wheel I'.

The pitman J connects the other end of said rocker-arm to a crank-wheel D⁴ on the outer end of one of the crank-shafts D. As shown in Fig. 6, the wrist-pin $d^4$ of said crank-wheel is adjustably connected thereto, being mounted in a transverse slot in the face thereof, and the stroke of the pitman may thus be varied as desired, and, as will be readily understood, the speed of the feed thus regulated.

The operation obviously is, as the crank-shaft revolves, that the rocker-arm is reciprocated, and from it the cam-feeder, through the shafts I, H, and G and their gears, is rotated, and thus the cutters are fed out as the cutting progresses. Preferably I place upon the extreme outer end of the shaft I a hand-wheel I³, having a handle $i^3$, by which, when a cut has been finished, the feeding mechanism can be rapidly turned in the reverse direction until the cam-feeder has been revolved to a position which permits the cutters to be retracted to their initial position, this being easily permitted without withdrawing the pawl $i^2$ from engagement with the ratchet-wheel I'. As before stated, the driving-pulley K is loosely mounted on the driving-shaft C. It is provided with an ordinary clutch formation carried by the clutch-yoke L, which is connected at one end by a pivot $l$ to an ear on the frame and at the other end by a pivot $l'$ to the rod M. Obviously as said rod M is moved longitudinally the clutch parts are thrown into or out of engagement thereby.

Referring now especially to Figs. 5, 4, 2, and 6, it will be observed that the rod M is adapted to be forced in one direction by the lever N, which lever is pivoted to the framework by a pivot $n$ and is suitably positioned for the purpose. In forcing this rod endwise, so that the clutch parts are brought into engagement, as will be seen most clearly by reference to Figs. 5 and 2, a spring M', which surrounds said rod, is compressed, said spring being interposed between an end member of the bridge-tree and a collar M² on the rod, which collar is adjustably secured on said rod by a set-screw $m^2$. Said rod M is also provided with another and tapered collar M³, which serves as a catch and which is adjustably secured to said rod by a set-screw $m^3$. The detent O, which is mounted in bearings in projections $p$ on the other end member of the bridge-tree, is adapted to pass behind and engage with the catch-collar M³, being operated thereto by the spring O', which is introduced between the adjustable collar $o'$ on said rod and one of the projections $p$. There is an arm H³ on the shaft H, which has an adjustable point $h^3$. On the opposite end of the rod O from the point where it engages with the catch-collar M³ is an arm O², which projects into the path of the point $h^3$ on the arm H³. The result is, when the shaft H is revolved, that at a certain period of its revolution it engages with this arm O² and forces the rod O endwise out of engagement with the catch-collar M³, whereupon the spring M' operates, through the described connections, to throw the clutch uniting the pulley K and shaft C out of engagement. As heretofore stated, the gear-wheels H' and G' and shaft G are permitted to remain stationary during a portion of the travel of the shaft H by means of the spring engagement between said wheel H' and said shaft H. The purpose of this is to stop the feeding of the cutters forward for a brief period before their reciprocating motion is stopped, thus enabling them to entirely clear themselves in the work and make smooth teeth. The parts are so adjusted that these few final strokes take place while the detent O is being moved by means of the arm H³, the spring $s$ being compressed by the arm H² at the same time. When the feeding mechanism is turned backwardly and the contact between the arms H³ and O² is thus separated, the spring O' returns the detent O to its normal position, its movement in this direction being stopped by the collar $o$. The tapered rear side of the catch-collar M³ enables said catch-collar to slide under and temporarily push aside the detent O, as the shaft M is being forced back by the lever N, and when forced into place said detent swings behind said catch-collar and holds it, as before. The machine then proceeds with its work, and so on until the set of teeth provided for are completely finished.

As will be readily seen, this machine, having several cutters equally disposed about the center, and being fed outward uniformly by a feed device against which they all equally bear, there is no sidewise strain upon the mechanism, and thus all danger of unequal cutting is obviated. There being several cutters which all work at once, the speed of the machine is also multiplied over a machine where single cutters are used, and I have, by my automatically-operating feeding mechanism, secured absolute uniformity in the travel of the cutters, the machine being automatically thrown out of operation when the predetermined point is reached.

Having thus fully described my said invention, what I claim as new, and desire to secure by Letters Patent, is—

1. In a gear-cutting machine, the combination of the frame, the revoluble table thereon having a central aperture, a head mounted to reciprocate in said aperture, a multiplicity of cutters carried by said head, said cutters being arranged in circular line within said central aperture of said table, and mechanism for operating said reciprocating head, whereby said cutters are operated simultaneously, substantially as set forth.

2. The combination, in an internal-gearcutting machine, of a framework, a work-table, two or more cutters extending up through said table, mechanism for driving said cutters, and a cam-feeder centrally disposed between the cutters and having as many cam-faces as there are cutters, and mechanism for driving the same.

3. The combination, in a machine for cutting internal gears, of the framework formed with a horizontal top having a central aperture, a work-table also formed with a central aperture mounted to revolve on the top of said frame and formed with apertures in its periphery, a bracket mounted on said frame alongside the edge of said table, a spring-mounted detent mounted in said bracket and adapted to engage with said apertures in the edge of said table, and the cutter-head mounted to operate in the central aperture in said frame-top and table, and mechanism for operating the same, substantially as set forth.

4. The combination, in an internal-gear-cutting machine, of the framework, guides on said framework, a cutter-head adapted to reciprocate in said heads, said cutter-head having inclined surfaces and inclined bearing-plates engaging with said surfaces, and means for adjusting said bearing-plates to secure an accurate bearing between said head and guides, substantially as shown and described.

5. The combination, in an internal-gear-cutting machine, of the framework having a cutter-inclosing tube T extending upwardly therefrom with slots in its sides, a cutter-head below said table with cutters connected thereto and extending up into said tube, the cutting-faces whereof project through slots in the sides of said tube, and a feeding-cam within said tube and behind the cutters, whereby, as said cam-feeder is rotated, the cutters are fed outwardly into the work, substantially as shown and described.

6. The combination, in an internal-gear-cutting machine, of a framework, a reciprocating cutter-head, cutters connected to said head and held within a cutter-inclosing tube, a cam-feeder within said tube and behind said cutters, and caps having cam-slots secured to the upper and lower ends of said cam-feeder.

7. The combination, in an internal-gear-cutting machine, of a suitable framework, guides thereon, a reciprocating cutter-head mounted in said guides, and cutters substantially in the form of saws secured to said cutter-head by means of links having a pivotal connection with the cutters and with said cutter-head and means for feeding said cutters outwardly.

8. The combination, in an internal-gear-cutting machine, with reciprocating cutters, of a feeder therefor consisting of a rotating structure having cam-faces which come in contact with the backs of the cutters and support said cutters while feeding them forward, substantially as shown and described.

9. The combination, in an internal-gear-cutting machine, with the cutter-feeder, of the rod or shaft G by which the same is operated, a wheel on said rod provided with stops, a second shaft provided with a spring-attached gear-wheel engaging with the gear-wheel on the cutter-feeder shaft, an arm on said last-named shaft, a clutch connected to the driving-pulley, a rod running from said clutch, a detent engaging with said rod, said detent being provided with an arm with which an arm on the last-mentioned shaft will engage as it revolves, whereby the clutch is automatically disengaged as the feeding mechanism reaches its final position.

10. The combination, in an internal-gear-cutting machine, of a driving-shaft, a driving-pulley loosely mounted on said shaft, a clutch, a rod connected to said clutch, a spring on said rod by which the clutch is normally held out of engagement, a catch-collar on said rod, a detent engaging with said catch-collar, and a connection between said detent and the feeding mechanism, whereby, when the feeding has reached the desired point, the detent is automatically withdrawn, and the clutch thrown out of engagement by means of its spring, substantially as set forth.

In witness whereof I have hereunto set my hand and seal, at Indianapolis, Indiana, this 29th day of November, A. D. 1895.

THOMAS J. LINDSAY. [L. S.]

Witnesses:
JAMES A. WALSH,
H. D. NEALY.